(12) United States Patent
Boelstler et al.

(10) Patent No.: US 7,631,830 B2
(45) Date of Patent: Dec. 15, 2009

(54) RETRACTOR WITH ROTARY RACK PRETENSIONER

(75) Inventors: Richard A. Boelstler, Lake Orion, MI (US); Kenneth H. Kohlndorfer, Roseville, MI (US); Robert E. Verhoven, Harsens Island, MI (US); Rudi Grzic, Sterling Heights, MI (US); Susan A. Richards, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 205 days.

(21) Appl. No.: 11/690,535

(22) Filed: Mar. 23, 2007

(65) Prior Publication Data

US 2007/0241223 A1 Oct. 18, 2007

Related U.S. Application Data

(60) Provisional application No. 60/744,965, filed on Apr. 17, 2006.

(51) Int. Cl.
*B65H 75/48* (2006.01)

(52) U.S. Cl. .................. 242/374; 242/384.2; 242/385.3

(58) Field of Classification Search .................. 242/374, 242/384.2, 385.3; 280/806; 297/478
See application file for complete search history.

(56) References Cited

U.S. PATENT DOCUMENTS

| 5,505,399 | A | 4/1996 | Schmid et al. |
| 6,264,281 | B1 | 7/2001 | Dukatz et al. |
| 6,405,959 | B1* | 6/2002 | Klingauf et al. ............. 242/374 |
| 6,419,272 | B1 | 7/2002 | Yamaguchi et al. |
| 6,513,747 | B1 | 2/2003 | Lee et al. |
| 6,575,498 | B2* | 6/2003 | Nagata et al. ............... 280/806 |
| 6,626,388 | B2* | 9/2003 | Nagata et al. ............... 242/374 |

* cited by examiner

*Primary Examiner*—Sang Kim
(74) *Attorney, Agent, or Firm*—Markell Seitzman

(57) ABSTRACT

A seat belt retractor (100) having a rotationally mounted spool (120) with a seat belt windable thereon and a pretensioner (300) for winding the spool in a belt winding direction to rewind the seat belt upon the spool; the pretensioner comprising a rack and pinion mechanism (350) activated by a pyrotechnic element (400) for causing a clutch assembly (200) to change state from a disengaged mode to an engaged mode in which the clutch assembly drivingly engages the spool.

18 Claims, 5 Drawing Sheets

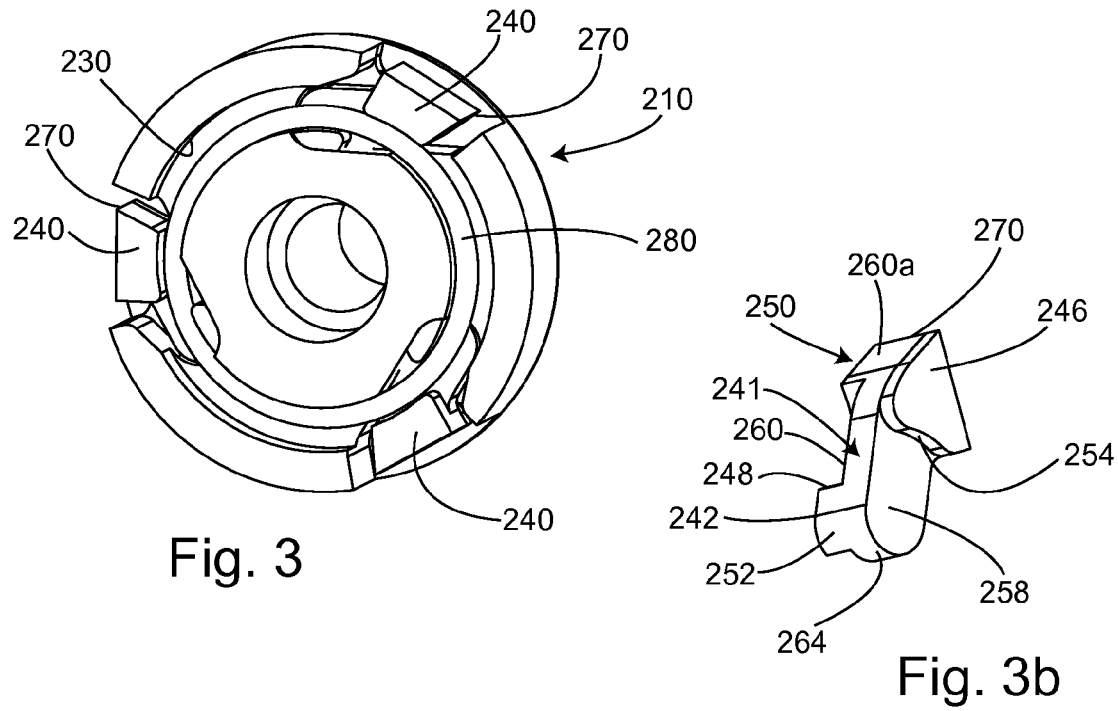
Fig. 3
Fig. 3b
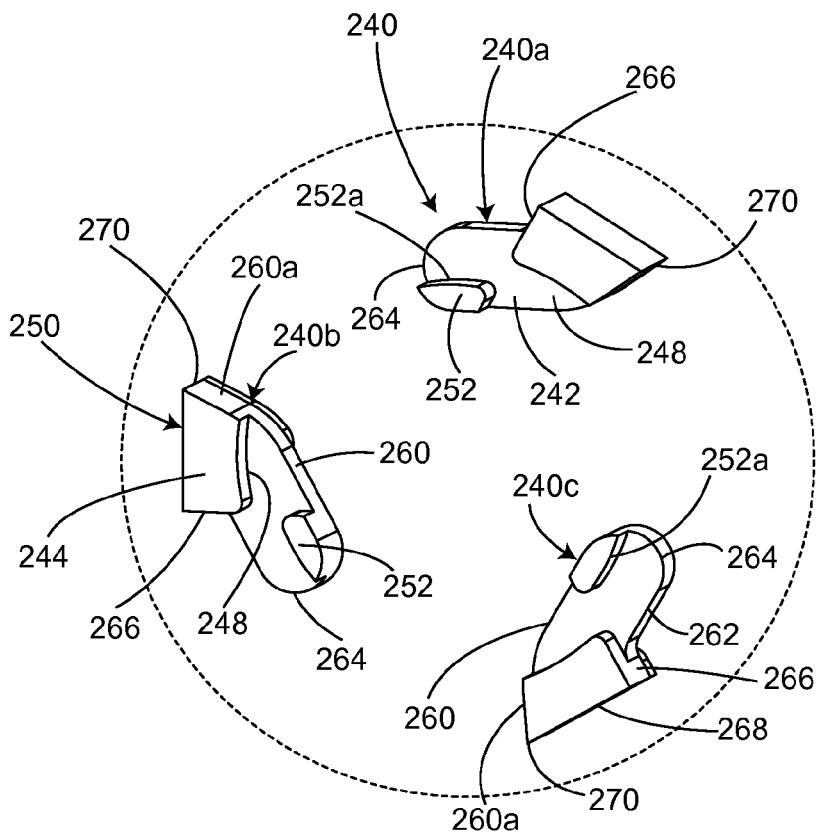
Fig. 3a

RETRACTOR WITH ROTARY RACK PRETENSIONER

This application claims the benefit of U.S. Provisional Application 60/744,965, filed on Apr. 17, 2006. The disclosure of the above application is incorporated herein by reference.

BACKGROUND AND SUMMARY OF THE INVENTION

The present invention relates to seat belt retractors and more particularly to a seat belt retractor assembly having a pretensioner (also called a belt tightening mechanism).

It is an object of the present invention to provide a seat belt retractor with a pretensioner that is compact in design, fast to engage with the spool of the retractor and one that provides for controlled loading of the spool during web rewinding.

Accordingly the invention comprises: a seat belt retractor having a rotationally mounted spool with a seat belt windable thereon and a pretensioner for winding the spool in a belt winding direction to rewind the seat belt upon the spool. The pretensioner comprises a rack and pinion mechanism activated by a pyrotechnic element, which causes a clutch assembly to change state from a disengaged mode to an engaged mode of operation in which the clutch assembly drivingly engages the spool. The clutch assembly comprises a clutch housing having provision to support a plurality of rotationally mounted clutch pawls. The clutch housing is received within a recess of the spool, such recess including a plurality of engagement teeth thereon, each of the clutch pawls configured to become column loaded between the spool and the clutch housing when in the engaged mode.

Many other objects and purposes of the invention will be clear from the following detailed description of the drawings.

BRIEF DESCRIPTION OF THE DRAWINGS

FIG. 2a is a plan view of the clutch housing of FIG. 2a.

FIG. 3 is an isometric view of a clutch assembly showing the clutch housing, clutch pawls and O-ring.

FIG. 3a is an isometric view showing three clutch pawls spaced one to the other (the clutch housing and O-ring are removed).

FIG. 3b is another isometric view of a single clutch pawl showing inter alia the bottom surface of a clutch pawl.

DETAILED DESCRIPTION OF THE DRAWINGS

Figure 1:
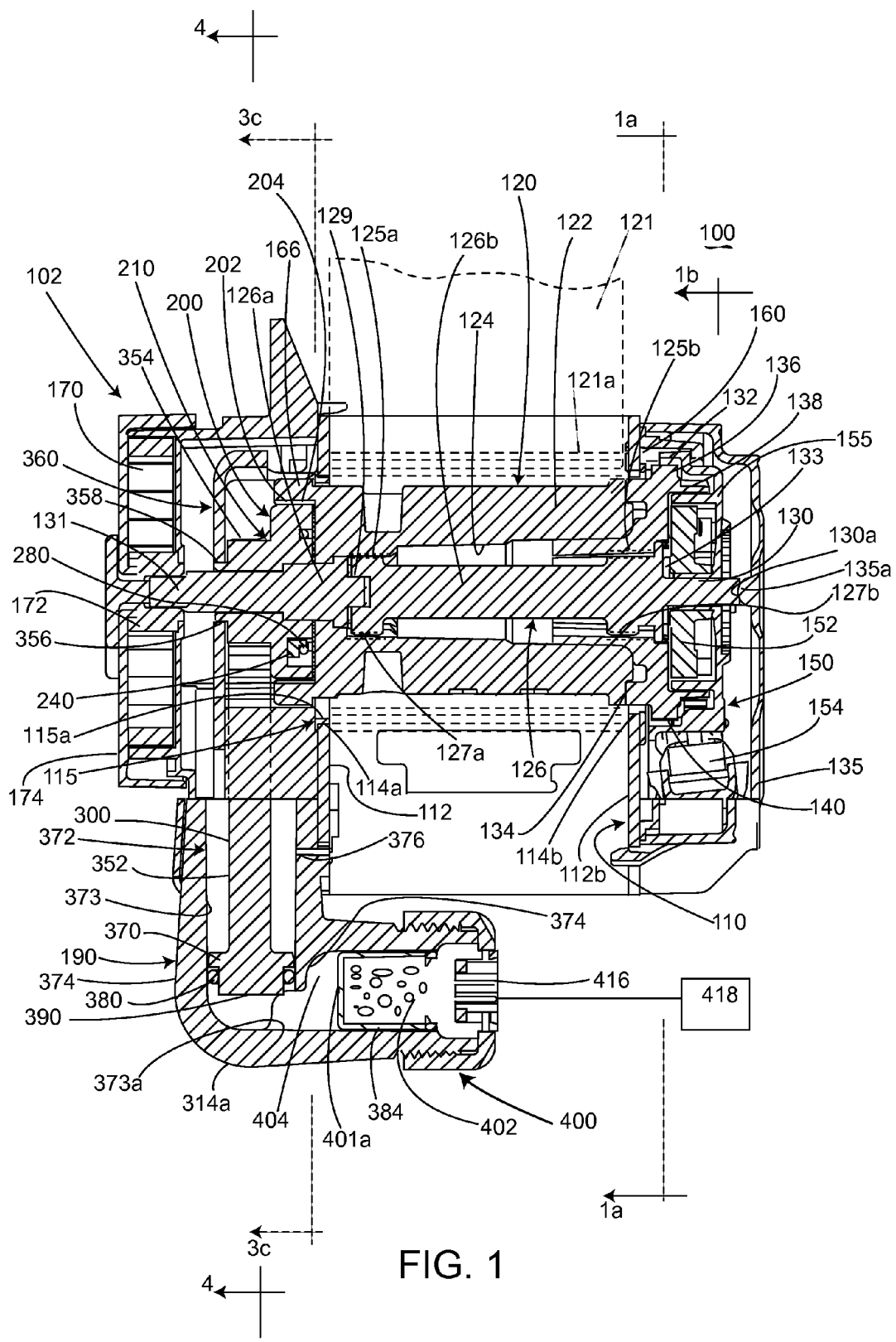
FIG. 1 is a cross-sectional view of a seat belt retractor incorporating the present invention.
Figure 2:
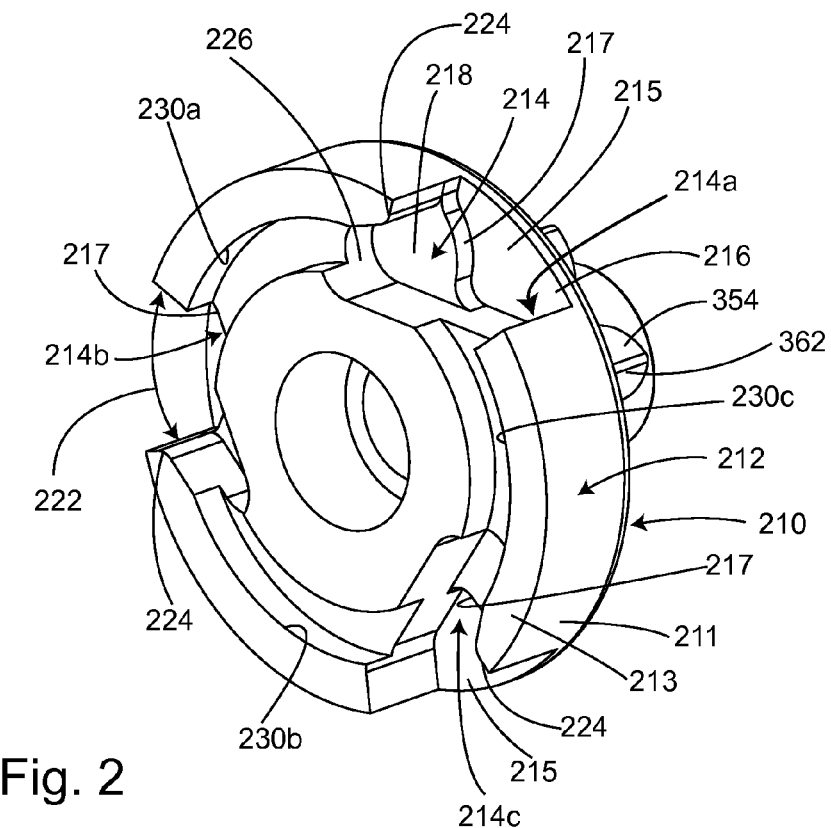
FIG. 2 is an isometric view of the clutch housing.
Figure 2A:
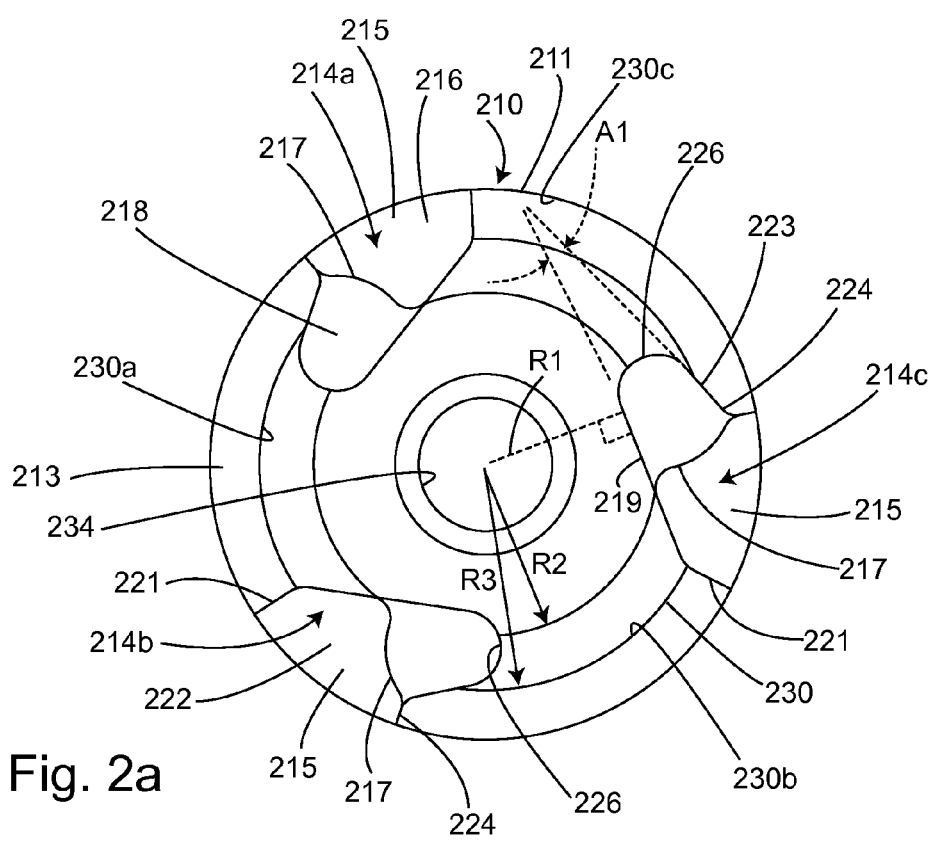

FIG. 1 illustrates the major parts of a seat belt retractor assembly 100 incorporating the present invention. The retractor assembly includes a seat belt retractor 102 generally of known construction and a rotary pretensioner 190, which when activated during a vehicular accident, rotates the spool of the retractor in a belt winding direction, thereby tightening the shoulder belt about the torso of the occupant to be protected.

The retractor 102 includes many components known in the art such as a U-shaped frame 110 having sides 112a and 112b with openings 114a and 114b therein; opening 114a receives a bearing plate 115 having an opening 115a to receive and support one side of a spool or spool assembly 120 about which a seat belt 121 is wound. Numeral 121a designates a portion of seat belt wound on the spool. The spool assembly 120 includes a spool 122 having a hollow bore 124 with a set of splines 125a and 125b therein, into which is received a shaft or driver 126. The shaft or driver 126 in the illustrated embodiment comprises two inter-fitting portions 126a and 126b. As can be appreciated, a single-piece shaft can be used. Shaft portion 126b in the illustrated embodiment is a torsion bar of known variety having a plurality of splines 127a and 127b, which matingly engages splines 125a and 125b within the spool 122.

Shaft portions 126a and 126b are drivingly connected, such connection being illustrated by numeral 129. Upon assembly, the end 131 of shaft 126 extends beyond the left face of spool 122 and is engagably received within a spring arbor 172. The opposing side or end 130 of driver 126 is received within a lock wheel or pilot wheel 132. The opposite side 130 is formed with a concave surface 130a supported by a convex surface 135a of a mechanism cover 135 that protectively encloses the inertia sensors and lock ring. A thrust washer 133 locates the shaft 126 within the spool and provides for reduced friction with adjacent parts. The pilot or lock wheel 132 is physically secured to a mating face 134 of spool 122. In the illustrated embodiment lock wheel 132 includes a plurality of ratchet wheels 136 and 138 respectively, which is a common design feature in many retractors.

Ratchet wheel 136 comprises a plurality of lock teeth 140, which lockingly engage a lock pawl 142 that is pivotably connected via a pivot pin 144 to side 112b of frame 110. As is known in the art, the lock pawl 142 and lock wheel 136 comprise part of the locking mechanism. Seat belt retractor locking mechanisms include a vehicle sensor inertial lock mechanism as well as a web sensor inertial locking mechanism 150, each of which is generally known in the art. One such inertial locking mechanism is illustrated in EP patent application EP0228729A1, which is incorporated herein by reference. In this referenced document the inertial mass of the vehicle sensor and the web sensor are housed within a lock ring 155 (also shown in FIG. 1 hereof) that is free to rotate about end 130 of the shaft. Upon engagement of the lock ring to the shaft, in a known manner, during moments of high vehicle deceleration or the high extraction speed of the seat belt from the retractor, the lock ring will rotate with the shaft, if only momentarily, which moves the lock pawl 142 into engagement with one or more teeth of the lock wheel.

Spool 122 is stabilized relative to openings 114a and 114b by a bushing 160, which supports a cylindrical surface 162 of the lock wheel 132, and by the bearing plate 115, which receives and supports a cylindrical surface 166 formed on the left side of spool 122. The shaft 126 is drivingly connected to a return spring 170 via the arbor 172 in a known manner. The rewind spring and arbor are protectively mounted within a spring housing 174 and a spring cover 176.

As mentioned, retractor 102 further includes pretensioner (also referred to as a belt tightener) 190. The pretensioner includes a clutch subassembly 200 and a rack and pinion mechanism generally shown as numeral 300. The rack and pinion mechanism 300 includes a pyrotechnic element 400, which shares portions of the rack and pinion assembly 300. The pyrotechnic element provides pressurized gas to move the rack and pinion assembly 300, which activates the clutch assembly, causing the spool to rotate in a belt-winding direction to reduce belt slack about the occupant wearing the seat belt.

As shown in FIGS. 2, 2a and 3-3f, the clutch assembly 200 includes a clutch housing 210, a plurality of clutch pawls, collectively referred to as 240 and individually as 240a-c, and an O-ring 280. The clutch subassembly 200 is received within a recess 202 formed at end 166 of spool 120. As more clearly illustrated in FIGS. 3c-3f, the recess 202 includes a roughened or friction enhancing surface 203 about its walls. This roughened or friction-enhancing surface can take the form of a plurality of small teeth 204 positioned about the periphery of recess 202. Splines or other indentations can provide the roughened surface. The clutch housing 210 (see FIG. 2) has a main body 212; the pinion gear 354 of the rack and pinion mechanism 300 extends from one side of the main body.

The main body is cylindrically shaped and includes an outer wall 211 and a front face 213. A plurality of relatively deep cavities 214a-c is formed in the front face 213. Each cavity 214 of the plurality of cavities includes a bottom 215 having a stepped configuration with a lower level 216 and an arcuately shaped shoulder 217, which separates the lower level 216 from a higher or raised level 218. The cavities 214a-c are equally spaced about the main body 212. Each cavity 214 includes a flat wall 219. Each wall 219 follows a chord; that is, wall 219 is perpendicular to a radius of R1. Each flat wall 219 transitions to a radially extending wall 221 proximate the outer wall 211. Each cavity 214 includes, generally opposite the flat wall 219, an open mouth or open end 222 and a short angled flat wall 223 oriented at an angle A1 to wall 219. The short, flat wall 223 transitions to a second radially extending wall 224 proximate mouth 222. Each cavity 214 further includes a curved end wall 226, which is generally circular in cross-section, located between and tangent to both the flat wall 219 and the angled flat wall 226, and generally opposite the opening end 222.

The main body 212 of the housing 210 further includes a circular groove 230 (see FIG. 2b, for example) recessed into the front face 213 at a depth less than that of each cavity 214. The inner diameter of the groove is denoted as R2 and the outer diameter of the groove is denoted as R3. The depth of the groove is sufficient to receive an O-ring 280 as discussed below. In view of the deeply recessed cavities 214a-c, the groove 230 has three circular segments 230a-c. Each groove segment 230a-c, proximate each curved end wall 226, includes a partial-cylindrical slot 231a, which deepens each groove segment 230a-c toward a corresponding one of the curved end walls 226. The main body 212 includes a center bore 234, which is received about a portion of the shaft 126. As will be seen, a clutch pawl 240 is pivotably received in each cavity 214.

Reference is again made to FIGS. 3, 3a, 3b and 3c, which show various views of one of the plurality of clutch pawls 240, as well as the clutch assembly 200. Each clutch pawl is configured to be relatively short, which reduces the overall size of the assembly 200. Each clutch pawl has a narrow shaft portion 241 (see FIG. 3b) and considerably wider head portion 250; this construction locates the center-of-gravity of the clutch pawl within the head portion. This construction also moves the center-of-gravity away from the pivot point of the clutch pawl to increase the effective radius (distance between the pivot point or surface and center-of-gravity), which tends to permit the clutch pawls to move outwardly faster at any given level of rotation of the clutch housing, which makes the clutch assembly quicker to operate than the prior art, which uses stamped pawls of uniform thickness.

Figure 3C:
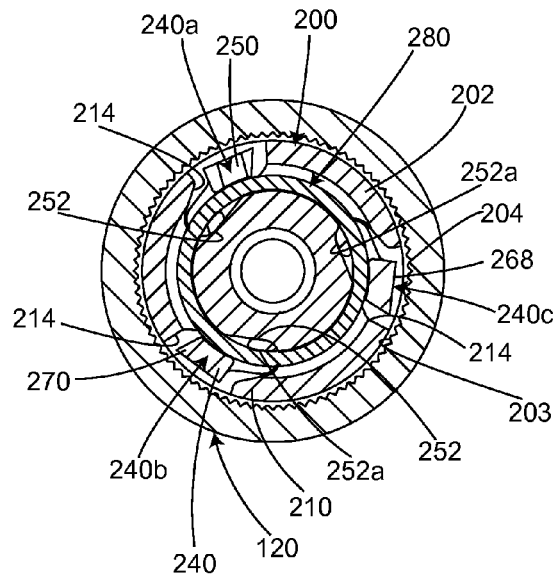
FIG. 3c is a front plan view of the clutch assembly of FIG. 3 fitted within a portion of a retractor spool.
Figure 3D:
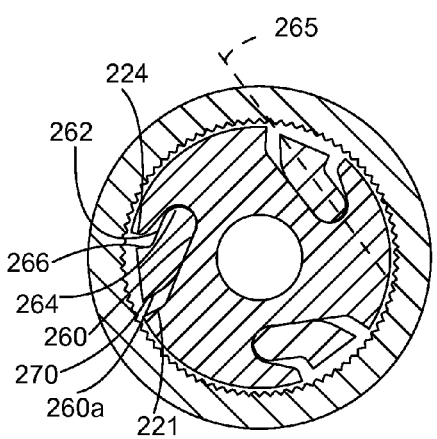
FIG. 3d is a cross-sectional view showing a plurality of clutch pawls in a deactivated position disengaged from the retractor spool.
Figure 3E:
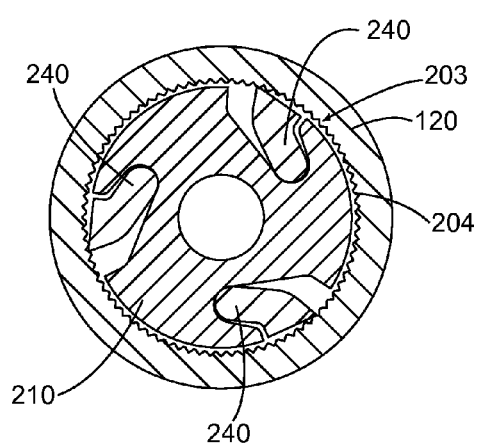
FIG. 3e is a cross-sectional view showing the plurality of clutch pawls in a position of initial engagement with the teeth of the retractor spool.
Figure 3F:
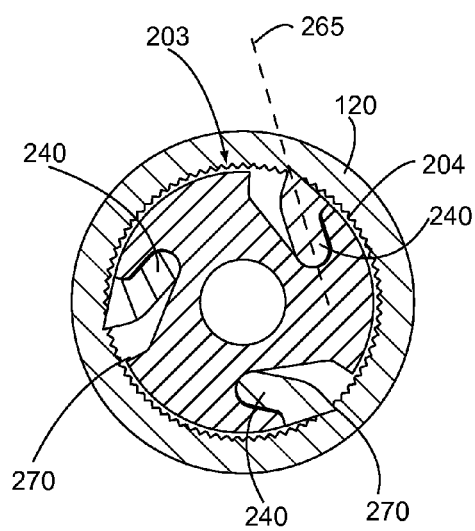
FIG. 3f is a partial view showing the clutch pawls fully engaged and column loaded between the spool and clutch housing.

Further, each clutch pawl is configured so that when it is fully locked against the spool, the pawl is column-loaded between the spool and the clutch housing, as shown in FIG. 3f. This construction permits the full engagement of each clutch pawl with the spool. As can be seen in FIG. 3f, the clutch pawl (preferably made of steel) in view of the column loading will dig into the softer spool (often made of zinc or aluminum). By column loading the pawls, sheer stress is minimized, lessening the tendency of the clutch pawl to bend or twist. Further, column loading the clutch pawl permits the clutch pawl to be made of a powdered metal with an effective hardness greater than that of the spool, which lessens the cost of the assembly.

Each lock pawl 240 is configured to rotate within its cavity 214 about the rear surface 226 between the engaged and disengaged positions. Each pawl is also configured to receive a portion of O-ring 280. As will be seen below, the O-ring 280 biases each of the clutch pawls 240 inwardly toward the center of the clutch housing 210; the bias force increases with outward angular displacement of the pawls 240, where the maximum bias or return force is generated when the clutch pawls are displaced outwardly at the engaged position with the teeth 204 of the spool.

Each of the clutch pawls 240 further includes a body 242 with a front face 244 and a rear face 246. As mentioned, the pawl is generally segmented into a shaft portion 241 and a head portion or head 250. A groove or recess 248 is formed upon the front face 244. The groove 248 forms one side of the head 250 and an inner side of an O-ring support 252, which extends upwardly as a projection from the bottom of the groove 248 (as can be seen in, for example, FIG. 3). Further, as can be seen in FIGS. 3 and 3c, portions of the O-ring 280 not within groove 230 (i.e. otherwise suspended portions of the O-ring) are received within a respective groove or recess 248 of each clutch pawl 240. The O-ring 280 pushes inwardly upon and biases each of the O-ring supports 252 inwardly into the clutch housing to the disengaged position.

Reference is briefly made to FIGS. 3a and 3c. Each O-ring support 252 includes an inner surface 252a (which receives the O-ring 280). Each of the inner surfaces 252a is configured so that when each clutch pawl 240 is in its disengaged position, the inner surface 252a visually represents an extension of the inner diameter of groove 230 (of the clutch housing 210). This smooth transition eliminates any kinks in the O-ring in the disengaged position.

As can be seen in FIGS. 3a and 3b, each rear face of a clutch pawl includes a shoulder or step 254 complementary in shape to shoulder 217 (see FIG. 2b). The shoulder 254 also enables the head 250 to be more massive in the area of the rear face 246 than an adjacent shaft 241 of the clutch pawl, which has a smooth surface 258. When installed in the clutch housing 210, the rear face 246 and surface 258 of the clutch pawl slide upon the level or surfaces 216 and 218 respectively.

Each of the pawls 240 includes a number of perimital surfaces such as first 260 and second 262 flat surfaces or sides, as well as a circular pivot surface 264. Surface 260 transitions into an outwardly extending surface 260a. The pivot surface 264 transitions to a load-bearing surface 266 that is complementarily shaped to the shape of surface 224 of the clutch housing 210. A generally flat surface 268 connects the load-bearing surface 266 to surface 260a; the intersection of surfaces 268 and 260a forms a shaped tooth 270. The tooth and the center of the curved surface 264 generally lie on a center-line 265 (see FIG. 3d) of the clutch pawl.

During the operation of the pretensioner 300, the clutch housing 210 is rotated at a high speed in a belt (seat belt) winding direction. The centrifugal acceleration causes each pawl 240 to rotate outwardly with each surface 264 rotating within surface or pocket 226 against the bias force of the O-ring 280. After each pawl 240 is moved outwardly by the centrifugal forces, the tooth 270 of each pawl 240*a*-*c* engages a portion of the roughed or friction enhancing surface, which in this embodiment is a respective tooth 204 of the spool 120. The roughened surface (teeth 204) is used primarily to initially engage with the tip of the pawl tooth 270, which urges the clutch pawl to rotate with the clutch housing 210 to its column loaded position, shown in FIG. 3*f*. Any further rotation of the clutch housing 210 causes the clutch teeth 270 to dig into the material of the spool. When each tooth 270 is fully engaged with a corresponding spool tooth 204, the surface 266 (of the pawl) column loads surface 224 of the clutch housing, permitting the clutch housing (via pinion gear 354) to forcefully rotate the spool 120. Upon such contact, the rotational forces acting on the clutch housing 210 are fully transferred to the spool 120 which, in turn, rewinds the seat belt 121 about the spool.

Figure 4:
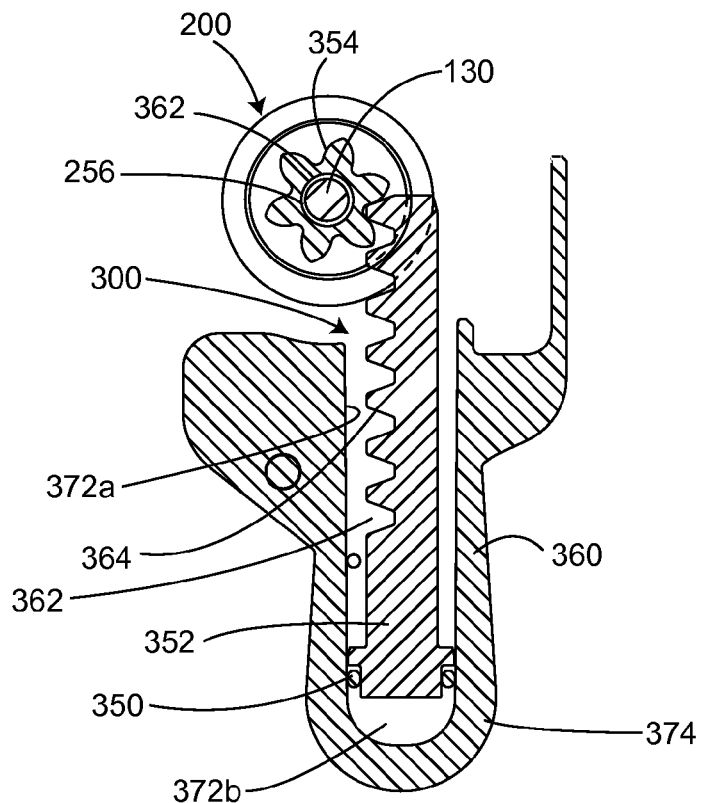
FIG. 4 is a cross-sectional view showing details of the rack and pinion assembly through section 4-4 of FIG. 1.

The rack and pinion assembly 350 as shown in FIGS. 1 and 4 comprises a rack 352 and a pinion gear 354. As mentioned, the pinion gear is formed as an extending portion of the clutch housing 210. The pinion gear 354 further includes an extending shoulder 356 that is received within opening 358 of a clutch bracket 360. The pinion gear includes a plurality of teeth 362 (see FIGS. 1 and 4). The rack is generally cylindrical in shape and includes a plurality of teeth 364, which matingly engage teeth 362 of the pinion gear. Initially, the rack is maintained in a disengaged state from the pinion gear. The rack, which acts as a piston, includes an enlarged head 370 slidingly received within bore 372 of a rack housing 374. Bore 372 includes a vent 376. The rack 352 further supports an O-ring 380, which sealingly engages the rack as well as bore 373.

The rack housing 374 also forms the housing or manifold for the propellant subassembly 400. The rack housing 374 includes an extending portion 374*a* with an extension 373*a* of bore 373. The pyrotechnic subassembly 400 includes a housing 401 and the housing supports a pyrotechnic element 402, capable of generating products of combustion when energized, and is received within bore 373*a*. The pyrotechnic element 402 includes a plurality of electrical contacts 416, one or both of which receive an electrical control signal from a controller such as an electronic control unit 418, which issues an activation signal upon determining the vehicle is involved in a crash, thereby energizing the pyrotechnic element 402. Bore 373*a* includes a terminus end 374 that is arcuately shaped and spaced from an end 401*a* of the housing 401. The spacing 464 between end 401*a* of the pyrotechnic element and curved end 374 of bore 373*a* permits the pyrotechnic housing 401 to open unabatedly and not create any flow restrictions that may impede the flow of gas to the base of the rack.

Figure 5:
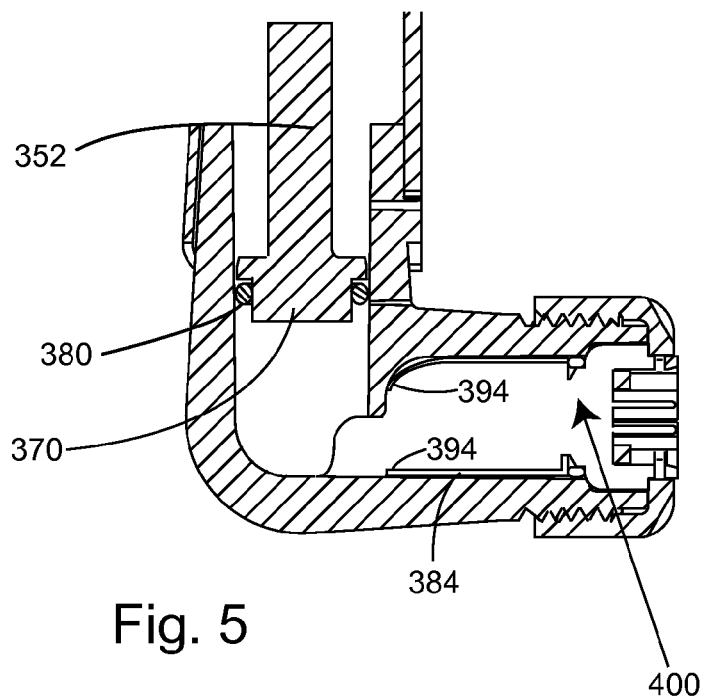
FIG. 5 shows a rack in an activated position.

Housing 401 is breakable and can be made of aluminum. Upon energization of the element 402, the end 401*a* of housing 401 petals outwardly as it is splits into segments as shown in FIG. 5, permitting a path for gas produced by the pyrotechnic material 386 to flow into bore 372 and impact base end 390 of rack 352, thereby propelling rack 232 upwardly into engagement and rotation with the pinion gear 354, as shown in FIG. 4. The broken and deformed end of the housing that has been urged outwardly against the walls of bore 374 is generally shown by numeral 394 in FIG. 5.

When the rack moves sufficiently so that O-ring 380 is above the location of vent 376, the gas within the bore, produced by the pyrotechnic element, can be vented to atmosphere, thereby reducing and eliminating the upward force acting upon the rack 352, tending to force it into engagement with the pinion gear 354. Thereafter, as the spool 120 rotates, even if the rack 352 remains in engagement with the pinion gear 354, this engagement will not impede the rotary motion of the spool.

Many changes and modifications in the above-described embodiment of the invention can, of course, be carried out without departing from the scope thereof. Accordingly, that scope is intended to be limited only by the scope of the appended claims.

The invention claimed is:

1. A seat belt retractor (100) having a rotationally mounted spool (120) with a seat belt wound or windable thereon and a pretensioner (300) for selectively winding the spool in a belt winding direction to rewind the seat belt upon the spool; the pretensioner comprising:

a power transfer mechanism (350) activated by a pyrotechnic element (400) for causing a clutch assembly (200) to change state from a disengaged mode to an engaged mode in which the clutch assembly drivingly engages the spool;

the clutch assembly (200) comprising a clutch housing (210) having provision to support a plurality of rotationally mounted clutch pawls (240, 240*a*-*c*), the clutch housing received within a recess (202) of the spool (120), each of the clutch pawls configured to be compressively loaded between the spool and the clutch housing when in the engaged mode;

wherein the clutch pawls (240) are symmetrically arranged within the clutch housing for rotation movement from the disengaged position to the engaged position, the clutch housing including an O-ring receiving feature (230) configured to support portions of an O-ring (280), the O-ring extending across portions of each pawl, each pawl including an O-ring receiving member (252) configured to receive an inner wall of the O-ring, the O-ring biasing each clutch pawl via the O-ring receiving member (252) to the disengaged position.

2. The apparatus according to claim 1 wherein the clutch housing (210) includes a plurality of pockets (226), one for each clutch pawl, the shape of each clutch pocket complementary to the curved surface of the pawl.

3. The apparatus of claim 1 wherein the pyrotechnic element includes a housing (384) having a frangible first end (401*a*), the frangible end configured to break into petals or sections; the housing is received within a remote portion (372*b*) of a bore (372), the remote portion of the bore (372*b*) being convexly shaped and spaced relative to the first end of the housing to receive at least one of the broken petals or sections of the housing.

4. The apparatus of claim 1 wherein the pawls are made from a powdered-metal.

5. The apparatus of claim 1 wherein the power transfer mechanism (350) is a rack and pinion mechanism.

6. The apparatus of claim 1 wherein the recess (202) in the spool has a peripheral surface (203), the peripheral surface configured to enhance engagement with the pawl.

7. The apparatus of claim 6 wherein the peripheral surface is configured to have one of teeth or a friction enhancing feature for engagement with the clutch pawls.

8. The apparatus of claim 1 wherein the clutch housing is cylindrically shaped and receivable within the spool recess (202) with the clutch pawls (240) positioned opposite the peripheral surface.

9. The apparatus of claim 1 wherein said recess includes a plurality of engagement teeth (204) thereon.

10. A seat belt retractor (100) having a rotationally mounted spool (120) with a seat belt wound or windable thereon and a pretensioner (300) for selectively winding the spool in a belt winding direction to rewind the seat belt upon the spool; the pretensioner comprising:

a power transfer mechanism (350) activated by a pyrotechnic element (400) for causing a clutch assembly (200) to change state from a disengaged mode to an engaged mode in which the clutch assembly drivingly engages the spool;

the clutch assembly (200) comprising a clutch housing (210) having provision to support a plurality of rotationally mounted clutch pawls (240, 240a-c), the clutch housing received within a recess (202) of the spool (120), each of the clutch pawls configured to be column loaded between the spool and the clutch housing when in the engaged mode;

wherein the clutch housing includes a front face (213) having a plurality of cavities (214a-c) formed thereon, each cavity having a stepped configuration having a lower level with an arcuately shaped shoulder (217) separating the lower level from a raised or higher level (218).

11. The apparatus of claim 10 wherein the cavities (214a-c) are equally spaced about a main body (212) of the clutch housing, each cavity (214) includes a flat wall (219) that is perpendicular to a radius of R1, each flat wall (219) transitions to a radially extending wall (221) proximate an outer wall (211), each cavity (214) includes, generally opposite the flat wall (219), an open mouth or open end (222) and a short angled flat wall (223) oriented at an angle A1 to wall (219), the short, flat wall (223) transitions to a second radially extending wall (224) proximate mouth (222), each cavity (214) further includes a curved end wall (226), which is generally circular in cross-section, located between and tangent to both the flat wall (219) and the angled flat wall (226), and generally opposite the opening end (222).

12. The apparatus of claim 11 wherein the main body includes grooved segments (230a-c) lying on a same radius effectively forming a circular groove (230) for receiving a resilient member including an O-ring (280).

13. The apparatus of claim 12 wherein each groove segment (230a-c), proximate each curved end wall (226), includes a partial-cylindrical slot (231a), which deepens each groove segment (230a-c) toward a corresponding one of the curved end walls (226), the main body (212) includes a center bore (234), received about a portion of the shaft (126), further, said clutch pawl (240) is pivotably received in each cavity (214).

14. The apparatus of claim 13 wherein each clutch pawl is configured to be relatively short, thereby reducing the overall size of the assembly (200), each clutch pawl has a narrow shaft portion (241) and considerably wider head portion (250) which is configured to locate the center-of-gravity of the clutch pawl within the head portion to increase an effective radius between the center of gravity and a pivot end of the pawl, thereby enhancing the speed of outward rotation of the pawl at any given level of speed of the clutch housing.

15. The apparatus of claim 14 wherein each clutch pawl has a hardness greater than that of the spool, and the clutch housing and clutch pawls are configured to enable the clutch pawls to be loaded from a single tooth through a centerline of the pawl to the clutch housing when the tooth of the pawl has engaged the peripheral surface of the spool.

16. The apparatus of claim 15 wherein each rear face of a clutch pawl includes a shoulder or step (254) complementary in shape to shoulder (217).

17. The apparatus of claim 15 wherein portions of the O-ring (280) not within groove (230) are received within a respective groove or recess (248) of each clutch pawl (240), wherein the O-ring (280) of each pawl includes an O-ring support (252) configured to engage with the O-ring (232), wherein the O-ring pushes inwardly upon and biases each of the O-ring supports (252) inwardly into the clutch housing to the disengaged position, each O-ring support (252) includes an inner surface (252a) to receive a portion of the O-ring (280), each of the inner surfaces (252a) is configured so that when each clutch pawl (240) is in its disengaged position, the inner surface (252a) effectively represents an extension of the inner diameter of groove (230) to achieve a smooth transition to eliminate any kinks in the O-ring in the disengaged position.

18. The apparatus of claim 10 wherein said recess includes a plurality of engagement teeth (204) thereon.

* * * * *